July 21, 1925.
N. A. PETRY
1,546,995
CUT-OUT
Filed Dec. 9, 1921
2 Sheets-Sheet 1
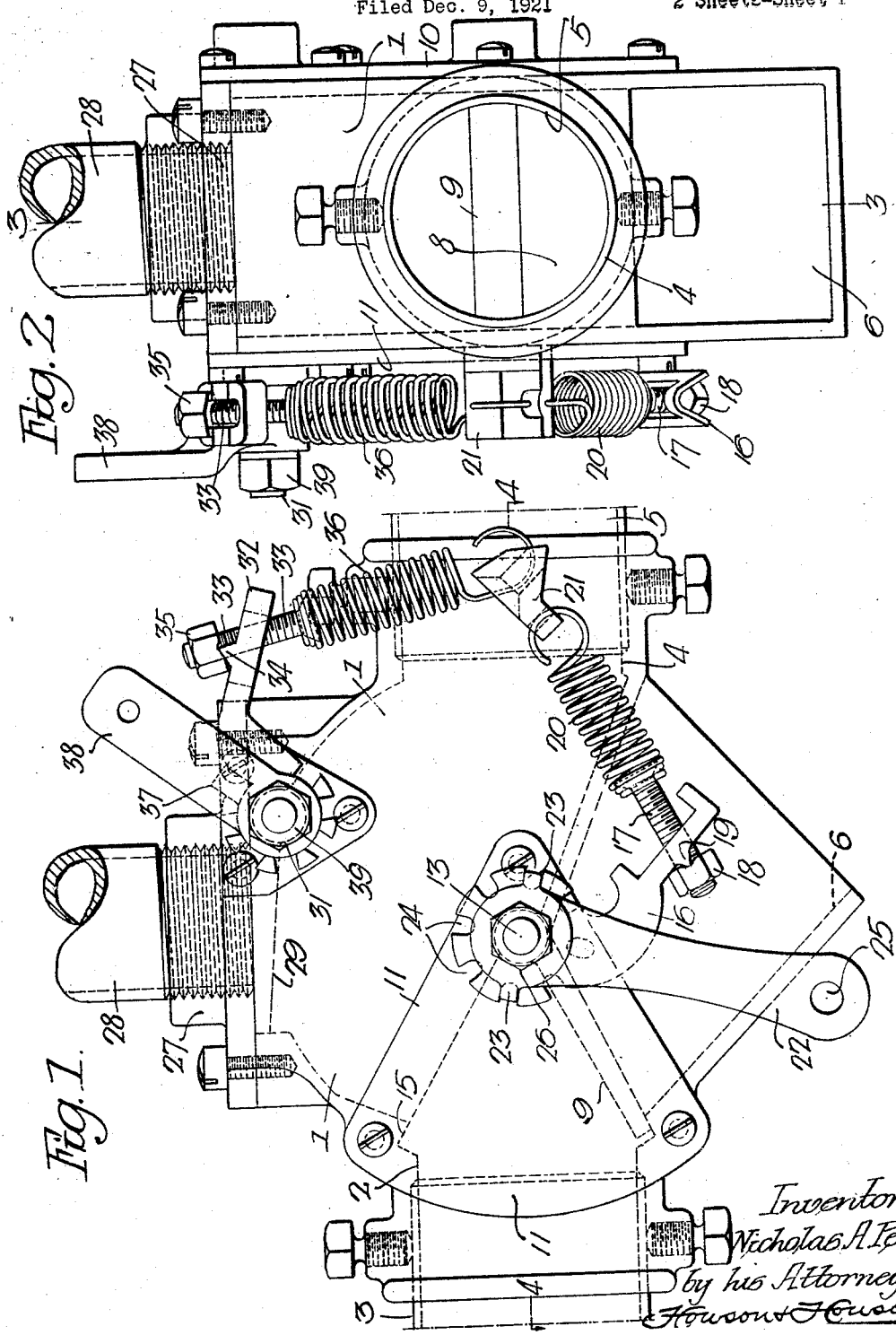
Inventor-
Nicholas A. Petry
by his Attorneys
Howson & Howson

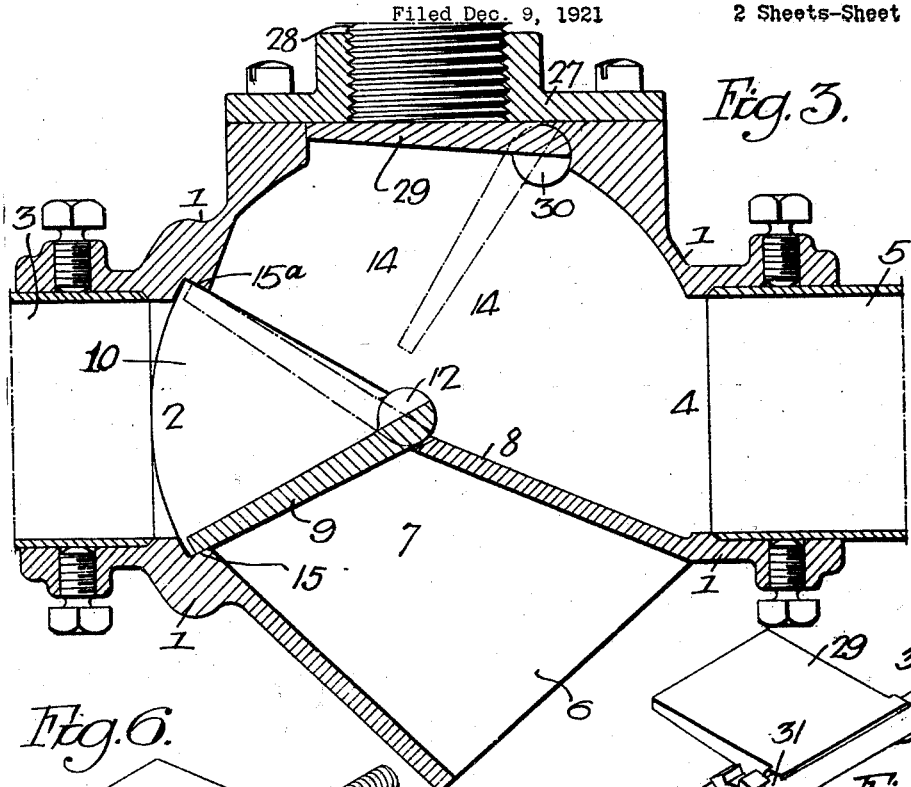
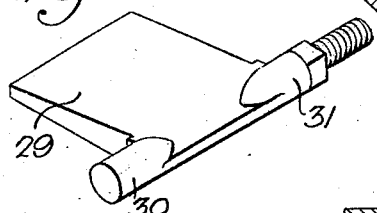
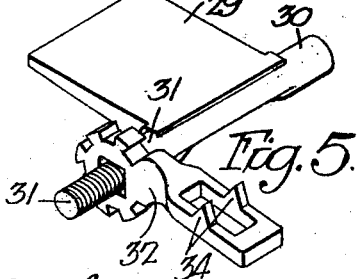
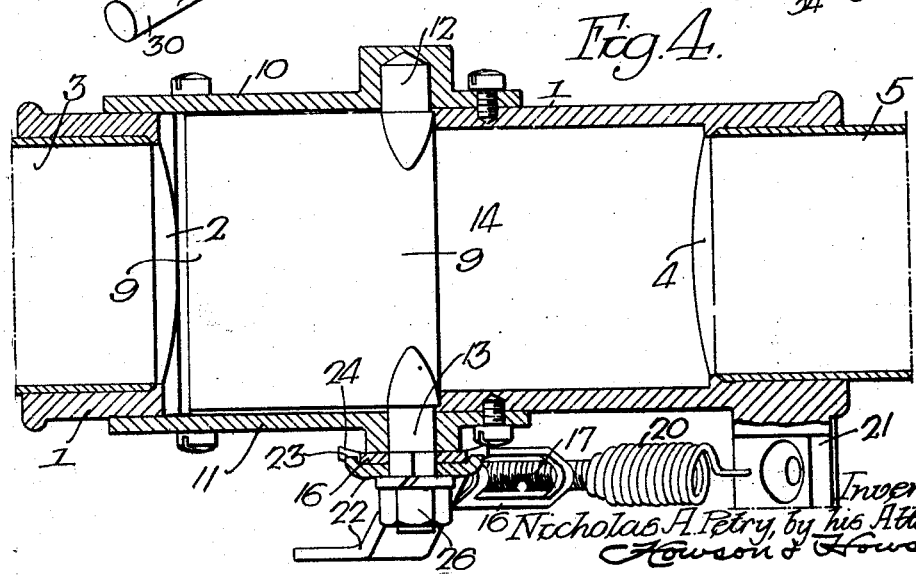

Patented July 21, 1925.

1,546,995

UNITED STATES PATENT OFFICE.

NICHOLAS A. PETRY, OF PHILADELPHIA, PENNSYLVANIA.

CUT-OUT.

Application filed December 9, 1921. Serial No. 521,238.

*To all whom it may concern:*

Be it known that I, NICHOLAS A. PETRY, a citizen of the United States, residing in Philadelphia, Pennsylvania, have invented a Cut-Out, of which the following is a specification.

One object of this invention is to provide a compact, substantial, conveniently operative device for controlling or directing the flow of exhaust gases from an internal combustion engine, and said invention more especially contemplates conveniently adjustable operating members especially designed to suit the device for operation by power transmitting elements approaching it from any direction.

A further object of the invention is to provide a novel form of valve which shall include a plurality of elements movable at will to direct exhaust or other gases from an inlet to any of three outlets and in which the arrangement of parts is such as to change the direction of the gases without producing an objectionable back pressure at the inlet.

A further object of my invention is to provide a tuning-up valve with a novel form of auxiliary gas directing member whereby a portion of the gas stream passing through the device may be diverted to serve some useful purpose.

I also desire to provide a novel form of movable element for use in connection with a cutout valve particularly designed to obstruct flow of gases to a minimum extent and require for its manufacture a reduced amount of metal as compared with that hitherto considered necessary.

These objects and other advantageous ends I attain as hereinafter set forth, reference being had to the accompanying drawings, in which, Figs. 1 and 2 are respectively a side and an end elevation of a cutout valve constructed in accordance with my invention;

Fig. 3 is a vertical section on the line 3—3, Fig. 2;

Fig. 4 is a horizontal section on the line 4—4, Fig. 1; and

Figs. 5 and 6 are perspective views of one of the movable valve elements with one of its associated operating arms.

In the above drawings 1 represents the body portion of my tuning-up or cutout valve, which may be of cast or other suitably formed metal having an inlet 2 designed for connection to the exhaust pipe 3 of an internal combustion engine, a main outlet 4 connected to a conduit 5 leading to a muffler and having an opening 6 leading direct to the atmosphere. This latter opening is at one end of a passage or chamber 7 formed by a partition 8 and portions of the front, back and side walls of the casing 1, which with the inner end of said partition are designed to form a seat for an oscillatory valve element 9; this chamber 7 preferably increasing in area of cross section from said valve seat to its outer opening 6.

The front and rear sides of the casing 1 are formed with substantially triangular supplemental openings in register with each other and designed to be closed by suitably formed segmental plates 10 and 11, of which the first provides an inwardly opening bearing or socket for a pintle portion 12 of the valve element 9 and the second is likewise formed with a bearing or socket for the second pintle portion 13 of said valve element. The main chamber 14 of the valve casing 1, while having one end opening into the outlet 4 and its opposite end opening into the inlet 2, may be cut off from the latter by the valve element 9. A lower seat for the valve element 9 is formed in part by the lower edges of the aforesaid triangular openings and in part by the lower surface 15 of a transverse groove in the wall of the casing. The said lower edges of the openings together with the surface 15 constitute a perfectly flat seat for the valve. An upper seat for the valve element 9 is formed by the upper surface 15$^a$ of a second transverse groove in the wall of the casing.

The valve element itself consists of a substantially rectangular plate having at one end integral pintle portions 12 and 13 respectively fitting the bearings or sockets in the plates 10 and 11. The valve element is formed with both faces of its body substantially flat to permit of an uninterrupted flow of gases. As will be noted particularly in Fig. 3 the lower face of the valve 9 is substantially tangent to the outline of the pintles. It is obviously essential that this surface be flat in order to properly fit the flat seat which has been described. With the surface tangent to the pintles the pintles are out of the way so that they do not interfere with whatever operation may be necessary to obtain the flat surface. As will be particularly clear from an inspection of Fig. 4, the pintles 12 and 13 are reduced or cut away near their points of juncture with the main part of the valve element so that they do not interfere with or obstruct the free flow of gases. The end of the pintle portion 13 projecting beyond its bearing in the plate 11 is squared for the reception of one end of an arm 16 whose opposite end is longitudinally slotted for the passage of a threaded stud 17. The latter has adjustably mounted upon it a nut 18 whose under face is provided with oppositely placed notches for the reception of angular projections 19 on opposite sides of the arm 16 providing knife edge bearings between it and said nut. The head of the stud is connected to one end of a spring 20, whose opposite end is attached to a lug 21 projecting from the side of the casing structure 1.

For moving the valve 9 at will an operating arm 22 is mounted on the projecting end of the pintle portion 13 and is formed with a pair of teeth 23 extending at right angles to its plane of movement into any one of several pairs of notches 24 formed in the arm 16 concentrically with the pintle portion 13. The outer end of this arm has an opening 25 for the reception of an actuating lever, chain, cable, or the like, and it may obviously be applied to the pintle portion in any of a number of different positions where it is immovably clamped by a nut 26 threaded on the outer extremity of said pintle portion.

From the foregoing description it will be clear that when the valve element 9 is in its lower position, as shown in full lines in Fig. 3, gases will be prevented from entering the atmospheric opening 6. Inasmuch as the valve seat and the lower surface of the valve are both flat a tight fit is assured. When the valve element is moved to its upper position as shown in dotted lines in Fig. 3, the gases are directed into the atmospheric opening 6. The spring 20 serves to nominally hold the valve element in its lower position and all tendency to vibrate or chatter is overcome.

For the purpose of deflecting for useful purposes a portion of the exhaust gases passing through the cutout casing, I provide it with an opening or passage entering the top of the chamber 14 and closed by a fitting or plate 27 into which is threaded or otherwise connected a conduit 28 leading to a heater, horn, or other piece of apparatus for utilizing gases from the casing 1. The inner face of the plate or fitting 27 is designed to serve as a seat for controlling valve 29 (Fig. 5) in the form of a flat, substantially rectangular plate having pintle portions 30 and 31 projecting from opposite ends of one of its sides or edges. The valve element 29 is similar to the valve element 9 and detailed description will not be repeated. This valve is designed to completely close or blank off the entrance into the conduit 28 when in one position, and to be capable of turning in the bearings provided for its pintle portions into a position indicated in dotted lines in Fig. 3, in which it projects into the main portion of the chamber 14 so as to lie substantially radial relatively to the axis of the valve element 9, under which condition it cuts off or closes the greater part of the cross sectional area of the chamber 14 and directs the greater part of the gases entering the same from the conduit 3 into the conduit 28.

For actuating this second valve element 29 the end 31 of its pintle portion has a squared part for the reception of an arm 32, slotted for the reception of a threaded stud 33 and on opposite sides of its slot formed with knife edges 34 for engagement with the nut 35 on said stud. The spring 36 has one end connected to the latter and its opposite end connected to the lug 21 so that it acts to normally hold the valve element 29 in the position in which it closes the entrance to the conduit 28. This spring actuated arm 32 is toothed concentrically with the axis of oscillation of the valve 29 for cooperation with a tooth 37 projecting from an operating arm 38 clamped onto the pintle portion 31 by a nut 39. As in the case of the main valve element 9, the operating arm may be adjusted to extend at any desired angle from the pintle 31 so that it may be most efficiently connected to and actuated by a rod, chain or cable leading from a suitable pedal or other operating member.

With the above described arrangement of parts and assuming that the valve elements 9 and 29 are in the positions illustrated, the exhaust gases entering the casing 1 from the conduit 3 will pass through the chamber 14 into the conduit 5 and so to the muffler. If now the valve element 9 be swung to its upper position indicated in dotted lines in Fig. 3, the muffler is cut out and the gases will pass directly into the atmosphere, thus adapting the device for use in "tuning up" the motor to which it is attached.

If while the valve element 9 is in its lower or normal position, the valve 29 be swung downwardly into the chamber 14 of the casing, a large proportion of the gases entering the same will be diverted through the conduit 28 to a heater or other apparatus connected thereto.

From the above description it will be noted that the device is compact and substantial in construction, the operating arms are capable of quick and convenient adjustment to suit the device for connection to operating elements extending to it in any direction, and the construction is such that none of the parts is likely to get out of order.

I claim:

1. A cut-out and heater valve for automobiles, comprising in combination an integral casing having two main openings at opposite ends adapted to be connected respectively with a pipe leading from the motor and with a pipe leading to the muffler, the said casing also having at the bottom an auxiliary cut-out opening leading into the atmosphere and at the top an auxiliary opening adapted to be connected with a pipe leading to a heater, a manually operable pivoted valve element in the casing near the atmospheric opening serving in one extreme position to close the said opening and in the other extreme position to close the passage to the upper part of the casing and thereby direct all gases into the atmospheric opening, and a second manually operable pivoted valve element in the upper part of the casing near the heater opening serving in one extreme position to close the said opening and in the other extreme position to direct gases thereinto but at the same time leaving the passage to the muffler outlet partly open.

2. The combination of a valve casing having an inlet, a main outlet and at least one auxiliary outlet with a flat seat adjacent thereto, and a valve element normally fitting the said seat and closing the said auxiliary outlet and consisting of a flat plate having pintle portions with which its seat engaging face is substantially tangent, the pintle portions being cut away at the opposite face of the valve element to permit the substantially unobstructed flow of gases thereover.

3. A cut-out valve for automobiles, comprising a casing having main inlet and outlet openings and also having an auxiliary outlet opening, a flat valve seat adjacent the auxiliary opening, and a valve element having two flat faces of which one is adapted to engage the flat seat, the said valve element also having integral pintles approximately tangent to the plane of the last said flat face and intersected by the plane of the other face, thus permitting the face which engages the said seat to be perfectly flat for convenience in manufacture.

NICHOLAS A. PETRY.